United States Patent
Butterworth et al.

(10) Patent No.: US 10,992,404 B2
(45) Date of Patent: Apr. 27, 2021

(54) METHODS AND APPARATUS FOR ISOCHRONOUS DATA DELIVERY WITHIN A NETWORK

(71) Applicant: Apple Inc., Cupertino, CA (US)

(72) Inventors: Ashley I. Butterworth, Normanhurst (AU); Girault W. Jones, Jr., San Jose, CA (US); Matthew X. Mora, Fremont, CA (US)

(73) Assignee: Apple Inc., Cupertino, CA (US)

( * ) Notice: Subject to any disclaimer, the term of this patent is extended or adjusted under 35 U.S.C. 154(b) by 669 days.

(21) Appl. No.: 14/458,139

(22) Filed: Aug. 12, 2014

(65) Prior Publication Data

US 2014/0348174 A1 Nov. 27, 2014

Related U.S. Application Data

(63) Continuation of application No. 13/098,934, filed on May 2, 2011, now abandoned.

(51) Int. Cl.
*H04J 3/16* (2006.01)
*H04L 12/861* (2013.01)
(Continued)

(52) U.S. Cl.
CPC ............ *H04J 3/16* (2013.01); *H04L 45/10* (2013.01); *H04L 47/564* (2013.01);
(Continued)

(58) Field of Classification Search
None
See application file for complete search history.

(56) References Cited

U.S. PATENT DOCUMENTS 3,944,927 A 3/1976 Reindl
5,742,623 A 4/1998 Nuber et al.
(Continued)

FOREIGN PATENT DOCUMENTS

| EP | 0719054 A2 | 6/1996 | |
| EP | 0719054 | * 6/2000 | .............. H04N 7/52 |
| WO | 9739556 A1 | 10/1997 | |

OTHER PUBLICATIONS

International Search Report of the International Search Authority in counterpart International Application No. PCT/US2012/036188, report dated Jan. 3, 2013.
(Continued)

*Primary Examiner* — Christopher T Wyllie
(74) *Attorney, Agent, or Firm* — BakerHostetler (57) ABSTRACT

Methods and apparatus for efficiently servicing isochronous streams (such as media data streams) associated with a network. In one embodiment, an Isochronous Cycle Manager (ICM), receives multiple independent streams of packets that include isochronous packets arriving according to different time bases (e.g., where each stream has a different time base). The packets are sorted by the ICM into a buffering mechanism according to their required presentation time. Additionally the ICM calculates a launch time for each packet. The NIC transmits the packets from the queue according to an access scheme, such as a time division multiplexed (TDM) scheme where each of a plurality of cycles is subdivided into time slots. During appropriate time slots, the NIC transmits the packets in chronological order, as read out of the buffering mechanism.

27 Claims, 6 Drawing Sheets

(51) Int. Cl.
*H04L 12/875* (2013.01)
*H04L 12/751* (2013.01)
*H04L 12/873* (2013.01)

(52) U.S. Cl.
CPC ........ *H04L 47/568* (2013.01); *H04L 49/9068* (2013.01); *H04L 47/521* (2013.01)

(56) References Cited

U.S. PATENT DOCUMENTS

| | | | |
|---|---|---|---|
| 6,021,403 A * | 2/2000 | Horvitz | G06N 5/00 |
| | | | 706/45 |
| 6,137,834 A * | 10/2000 | Wine | H04N 19/179 |
| | | | 375/240 |
| 6,161,160 A * | 12/2000 | Niu | H04L 12/40032 |
| | | | 709/213 |
| 6,598,172 B1 | 7/2003 | VanDeusen et al. | |
| 6,611,624 B1 * | 8/2003 | Zhang | H04N 21/23406 |
| | | | 370/498 |
| 6,680,944 B1 | 1/2004 | Lym et al. | |
| 7,725,202 B2 * | 5/2010 | Chen | H04N 21/44016 |
| | | | 700/94 |
| 2001/0007568 A1 * | 7/2001 | Morris | H04N 9/8042 |
| | | | 370/473 |
| 2001/0019561 A1 | 9/2001 | Staats | |
| 2002/0041603 A1 | 4/2002 | Kato | |
| 2002/0057893 A1 | 5/2002 | Wood et al. | |
| 2002/0078273 A1 | 6/2002 | Jacobs | |
| 2002/0131398 A1 * | 9/2002 | Taylor | H04N 21/4305 |
| | | | 370/350 |
| 2002/0150126 A1 * | 10/2002 | Kovacevic | G11B 27/10 |
| | | | 370/503 |
| 2003/0021298 A1 | 1/2003 | Murakami et al. | |
| 2003/0081611 A1 | 5/2003 | Goetzinger et al. | |
| 2003/0142696 A1 * | 7/2003 | Holmeide | H04L 12/427 |
| | | | 370/508 |
| 2004/0114607 A1 | 6/2004 | Shay et al. | |
| 2004/0125825 A1 | 7/2004 | Lym et al. | |
| 2004/0133661 A1 | 7/2004 | Yoon et al. | |
| 2004/0160971 A1 * | 8/2004 | Krause | H04L 47/50 |
| | | | 370/412 |
| 2004/0264485 A1 | 12/2004 | Okamura | |
| 2004/0264577 A1 | 12/2004 | Jung | |
| 2005/0169175 A1 | 8/2005 | Apostolopoulos | |
| 2005/0195823 A1 * | 9/2005 | Chen | H04L 49/351 |
| | | | 370/395.1 |
| 2006/0007960 A1 * | 1/2006 | Liu | H04N 21/8547 |
| | | | 370/503 |
| 2006/0083232 A1 | 4/2006 | Jin | |
| 2007/0291678 A1 | 12/2007 | Chowdhury et al. | |
| 2008/0256272 A1 * | 10/2008 | Kampmann | H04L 47/2433 |
| | | | 710/57 |
| 2009/0083811 A1 | 3/2009 | Dolce et al. | |
| 2009/0182939 A1 | 7/2009 | Hluchyj et al. | |
| 2009/0285217 A1 * | 11/2009 | Frink | H04N 21/4385 |
| | | | 370/394 |
| 2010/0002632 A1 | 1/2010 | Park et al. | |
| 2010/0142624 A1 * | 6/2010 | Fujita | H04N 21/4307 |
| | | | 375/240.25 |
| 2011/0072148 A1 * | 3/2011 | Begen | H04L 65/4069 |
| | | | 709/231 |
| 2011/0149967 A1 * | 6/2011 | Chen | H04L 12/40013 |
| | | | 370/392 |
| 2012/0023357 A1 | 1/2012 | Whitby-Strevens | |

OTHER PUBLICATIONS

B. Moses, G. Bartlett, "Audio Distribution and Control using the IEEE 1394 Serial Bus"; Pavo, Inc., Seattle, Washington, USA; IEEE, US, 1997, XP002682913, 27 sheets.

\* cited by examiner

METHODS AND APPARATUS FOR ISOCHRONOUS DATA DELIVERY WITHIN A NETWORK

CROSS-REFERENCE TO RELATED APPLICATION

This application is a continuation of U.S. patent application Ser. No. 13/098,934, filed on May 2, 2011, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of computerized devices, networks and buses. More particularly, in one exemplary aspect, the present invention is directed to efficiently servicing isochronous streams associated with a network.

2. Description of Related Technology

Certain types of multimedia content processing are based on isochronous data delivery protocols. The term "isochronous" generally refers to processes where data must be delivered within certain time constraints for use. For example, as used in streaming multimedia, an isochronous transport mechanism ensures that data is delivered with enough time to render audio and video to provide smooth, uninterrupted content to the user or consumer. Data which is not delivered in time for rendering cannot be used, and is generally ignored.

In contrast, the term "asynchronous" refers to processes where data transfer does not have a guaranteed time constrained delivery. Asynchronous delivery is also sometimes referred to as "best effort delivery"; each user receives the "best effort" the network can support, based on existing traffic conditions and requirements.

IEEE Std. 802.3 and IEEE Std. 802.11 network infrastructures have been designed to support asynchronous data delivery. For example, typical IEEE Std. 802.3 compliant Ethernet network interface controllers (NICs) operate on a First-In-First-Out (FIFO) basis. Part of the reason for this is that FIFO operation is well suited for asynchronous data delivery over flexible network topologies. Consider a node with M sources and N destinations (where M and N may be different); each packet received from each of the M sources is sent in turn to the next node. By chaining multiple "hops" together, the network topology can be made arbitrarily complex. This feature is especially useful for networks which experience constant flux or intermittent failures because packet routing can be changed on-the-fly to resolve network obstructions.

In contrast, IEEE Std. 1394 compliant systems have been designed to support isochronous data delivery. For example, IEEE Std. 1394 compliant systems reserve an amount of bandwidth for each isochronous channel. The reserved bandwidth is further allocated for each node, from source to destination. In this fashion, each source is isolated from the behavior of other sources, and the overall transmission delay between source and destination is fixed and predictable.

Recent improvements to existing network technologies (e.g., IEEE Std. 802.3 and IEEE Std. 802.11 type networks, etc.) have incorporated some isochronous data delivery capabilities. For example, existing Ethernet NICs can transmit packets at designated launch times, which can support delivery of isochronous data at regular time intervals.

However, IEEE Std. 802.3 (and IEEE 802.11 Std.) type networks have very loose time synchronization which can create problems with launch time guarantees. In particular, since each data stream has its own time base, combining multiple streams can fill the FIFO with out-of-order packets. Out-of-order packets will be dropped or delivered too late, with using the existing launch time guarantees. Consequently, existing devices cannot support multiple isochronous data streams.

Accordingly, incipient research is directed to further improvements for delivery of isochronous data content within existing network infrastructures

SUMMARY OF THE INVENTION

The present invention satisfies the foregoing needs by providing, inter alia, methods and apparatus for efficiently servicing isochronous streams for a data network.

In one aspect of the present invention, a method of managing a plurality of isochronous processes is disclosed. In one embodiment, the method includes receiving multiple isochronous data streams, each isochronous data stream includes a plurality of isochronous data packets, where each packet has a presentation time; sorting each isochronous data packet according to the presentation time; calculating a launch time for each isochronous data packet of the multiple isochronous data streams; and transmitting the isochronous data packets according to the launch time.

In one variant, the method additionally includes receiving asynchronous data packets; and transmitting the asynchronous data packets. In one exemplary configuration, the asynchronous data packets are sorted with the isochronous data packets. In another exemplary configuration, a first portion of bandwidth is reserved for isochronous data packets, and a second portion of bandwidth is reserved for asynchronous data packets.

In another variant, the act of sorting includes storing the isochronous data packets into a ring buffer according to presentation time.

In yet another variant, at least one of the multiple isochronous data streams comprises video and/or data.

In still other variants, at least one of the multiple isochronous data streams have different time base. In one such exemplary implementation, the act of calculating comprises adjusting the launch time of the isochronous data packets according to a master time base.

In a second aspect of the invention, a method for reconstructing a plurality of isochronous processes is disclosed. In one embodiment, the method includes receiving one or more unreserved time slots of packet data, the time slot comprising a plurality of packets transmitted in chronological order. At least one packet has a presentation time associated therewith, and the method further includes extracting the at least one packet, and presenting the at least one packet at the associated presentation time.

In a first variant, the at least one packet includes an isochronous data packet.

In a second variant, at least another packet includes an asynchronous data packet.

In a third variant, only a subset of packets have a presentation time associated therewith.

In a fourth variant, the subset of packets are stored in order of arrival into a First-In-First-Out (FIFO) buffer.

In some embodiments, the at least one packet includes video data. Alternately, the at least one packet includes one or more subpackets of data. In one such example, the one or more subpackets of data include a video subpacket and an audio subpacket.

In a third aspect of the invention, a network interface apparatus is disclosed. In one embodiment, the network apparatus includes: a transmission queue, the transmission queue configured to transmit a plurality of slots of data at a designated time; a data interface configured to receive a plurality of isochronous data streams, the plurality of isochronous data streams having one or more different time references; a network interface clock, the network interface clock configured to generate a designated time reference; and at least one controller. The at least one controller is configured to: extract one or more data packets from the plurality of isochronous data streams; sort the one or more data packets based at least in part on a presentation time; calculate a launch time for each of the one or more data packets; and transmit the slots of data at the calculated launch time.

In one variant, the calculated launch time is based at least in part on a difference between the one or more different time references and the designated time reference.

In other variants, the sorted one or more data packets are assigned to a slot of data.

In a fourth aspect of the invention, a method of processing isochronous data streams is disclosed. In one embodiment, the method includes: receiving multiple isochronous data streams, each isochronous data stream comprising a plurality of isochronous data packets; determining a sorting criterion for the multiple isochronous data streams; sorting at least a portion of the isochronous data packets in each stream according to the determined sorting criterion to produce a sorted order of data packets; and transmitting the isochronous data packets according to the sorted order.

In a fifth aspect of the invention, a computer readable medium for processing isochronous data streams is disclosed.

In a sixth aspect of the invention, an endpoint device for processing isochronous data streams is disclosed.

In a seventh aspect of the invention, a node device for processing isochronous data streams is disclosed.

Other features and advantages of the present invention will immediately be recognized by persons of ordinary skill in the art with reference to the attached drawings and detailed description of exemplary embodiments as given below.

DETAILED DESCRIPTION OF THE INVENTION

Overview

The present invention provides, inter alia, methods and apparatus for efficiently servicing isochronous streams, such as may be used in a data network. As described in greater detail herein, the invention leverages incipient improvements in extant controller architectures (e.g., Ethernet network interface controllers (NICs)) by adding scheduling capabilities to various components of the network. Specifically, in one embodiment, the scheduling algorithms interleave and/or deinterleave multiple independent chronological streams of packets by calculating a launch time for each packet (based at least in part on the packet's presentation time). Scheduling each packet for transmission ensures that the packets are transmitted in their proper presentation sequence.

In one implementation, an Isochronous Cycle Manager (ICM) receives multiple isochronous streams of packets, where each packet has a required presentation time. The ICM generates an interleaved output stream of packets by pre-sorting the packets in accordance with the presentation time base. Each packet of the interleaved output stream is further assigned a launch time and queued for transmission. Thereafter, the network interface controller (NIC) transmits the queue of packets, where each packet is transmitted according to launch time. In an alternate implementation, the ICM receives an isochronous stream of packets, and deinterleaves the stream into multiple streams of packets that are pre-sorted according to the presentation time base, assigned a launch time, and transmitted according to launch time.

Since existing network technologies (e.g., IEEE Std. 802.3 and IEEE Std. 802.11 type networks, etc.) do not have strict time synchronization requirements, the ICM of the exemplary embodiment considers multiple factors when calculating launch time. By pre-sorting packets for transmission, each isochronous data stream can be delivered efficiently (i.e., without network resource under-utilization) within the appropriate time restriction(s). For example, in one variant, a device can handle heterogenous mixtures of asynchronous and isochronous packets. Still other variants may consider parameters such as packet priority, packet type, etc.

Various combinations of the interleaving and deinterleaving of packets are also described. For example, in one variant, a device can support any arbitrary mapping of M isochronous streams to N isochronous streams.

Detailed Description of Exemplary Embodiments

Exemplary embodiments of the present invention are now described in detail. While these embodiments are discussed primarily in terms of the IEEE 802.3 family of Ethernet network standards (and the IEEE 802.11 family of Wireless Local Area Network (WLAN)), it will be recognized by those of ordinary skill that the present invention is not in any way limited to the foregoing network technologies. In fact, various aspects of the present invention can be adapted for use in any packet-based network that is capable of enforcing presentation time requirements for packets.

As used herein, the term "network" refers without limitation to any network configured to transfer data as suitably-sized groupings called packets. Packet networks can deliver streams of data (composed of sequences of packets) to a community of devices. During transfer, packets are buffered and queued, and may experience variable delays and throughput depending on the traffic load in the network. Common examples of packet-based networks include the Internet (i.e., the global system of interconnected computer networks), as well as privatized internets, and intranets.

As used herein, the term "source" refers to a device or interface configured to packetize information for transfer via a packet-based network. As used herein, the terms "destination", "target", and/or "sink" refer without limitation to a device or interface configured to extract information from a packet. Moreover, as used herein the term "endpoint" generally refers without limitation to the portion of a device that is a "source" and/or "destination" of information in a communication flow between devices. Similarly, as used herein, a "node" refers without limitation to a device which receives packets, and forwards the packets to another device.

These definitions should in no way be considered limiting; e.g., a client device or other entity may or may not include a logical or physical "endpoint" and/or "node" within the network. It is further appreciated that a device may (and generally will) simultaneously implement source, destination and node functionalities; the foregoing distinctions being made only for the purposes of clarifying various aspects of the present invention.

Furthermore, while some embodiments are shown in the context of a wired data bus or connection, the invention is equally applicable to wireless alternatives or interfaces such as, without limitation, WLANs such as IEEE Std. 802.11 wireless networks, WMANs such as IEEE Std. 802.16 wireless networks, personal area networks (PANs), Bluetooth™, infrared, and optical communication links.

PRIOR ART OPERATION

Figure 1:
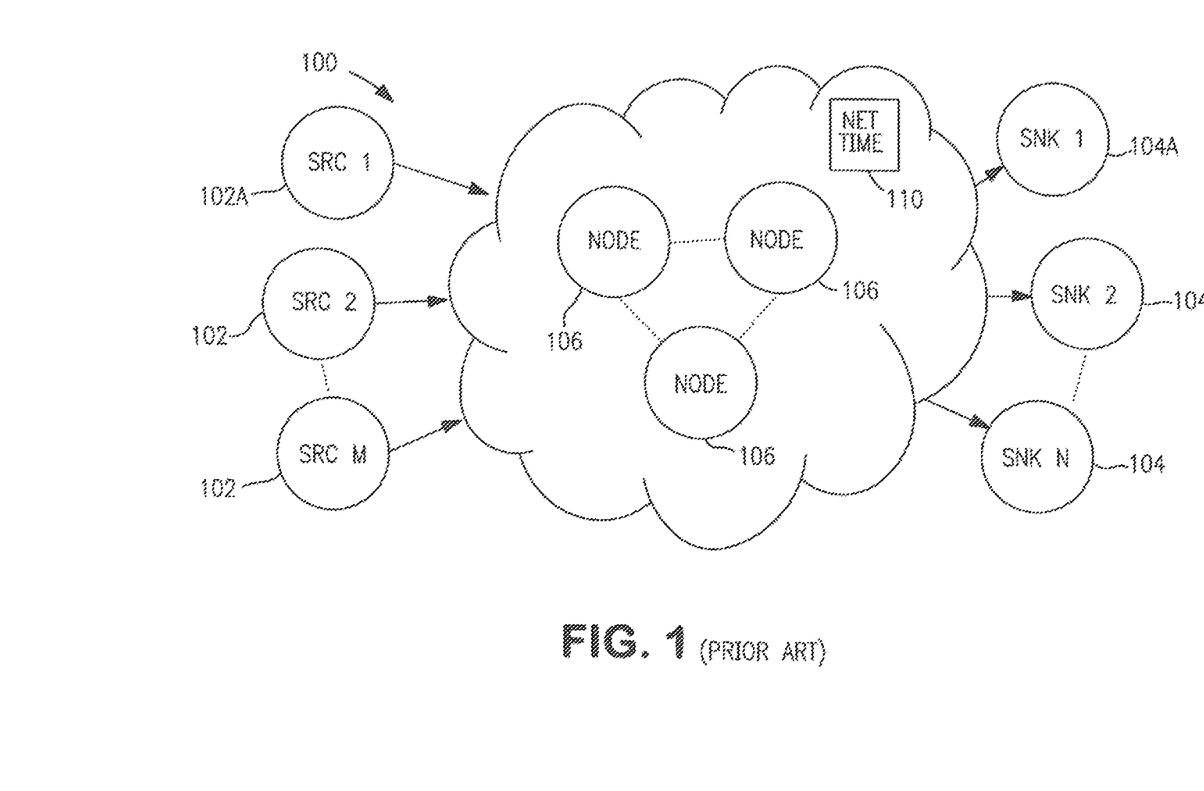
FIG. 1 is a functional block diagram illustrating one exemplary prior art packet-switched network.

FIG. 1 illustrates one exemplary prior art packet-based network 100. In the illustrated embodiment, the network 100 includes a number of sources (M) 102 in communication with a number of sinks (N) 104 via a network of nodes 106. The packet-based network 100 has a network time base 110 associated therewith.

The network 100 is composed of a collection of nodes connected to a collection of endpoints. Common examples of endpoints include, but are not limited to, personal computers (PCs), whether desktop, laptop, handheld or otherwise, network media devices (such as digital settop boxes), and mobile devices such as smartphones, PDAs, digital and video cameras, personal media devices (PMDs) (such as MP3 players, printers or rendering devices), or any combinations of the foregoing. Typically, nodes include, but are not limited to, servers, computers, routers, firewalls, gateways, etc.

Incipient modifications to Ethernet network interface controllers (NICs) have incorporated so-called "launch time" guarantees (i.e., the NIC can transmit a packet at a specified time). Referring back to FIG. 1, a first source 102A can connect via a collection of nodes 106 to a first sink 104A. Accordingly, the first source and the first sink can establish a guaranteed isochronous connection within those time constraints.

Unfortunately, existing Ethernet infrastructure does not have stringent time synchronization requirements. For example, Ethernet network time 110 can vary by as much as ten milliseconds (10 ms) between devices, whereas packet transmission can occur in only a fraction of that time. Consequently, the NIC (which has a much higher time resolution) cannot optimally determine transmission times based only on packet presentation time.

Method

Figure 2:
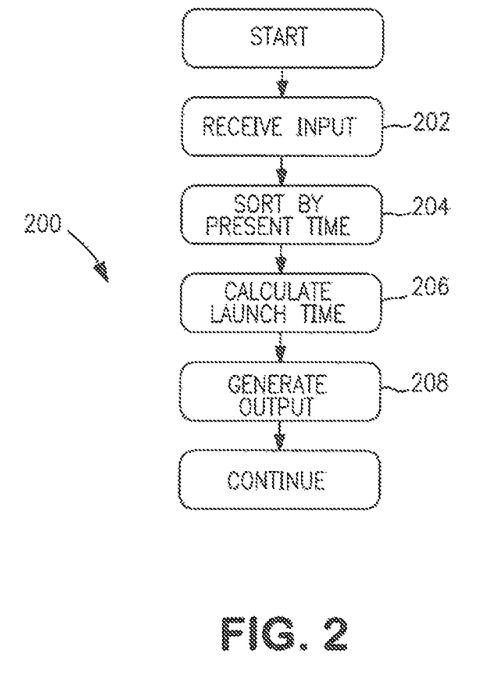
FIG. 2 is a logical flow diagram illustrating one embodiment of a generalized method for scheduling multiple independent chronological streams of packets according to the invention.

Referring now to FIG. 2, one embodiment of a generalized method 200 for efficiently servicing isochronous streams in a network according to the invention is illustrated. Various aspects of the present invention leverage the incipient improvements in isochronous data delivery by pre-sorting isochronous data for transmission. Specifically, in one embodiment, an Isochronous Cycle Manager (ICM) interleaves and/or deinterleaves multiple independent chronological streams of packets based on presentation time, and one or more additional considerations. The ICM scheduler can handle a wide population of presentation requirements (e.g., streams which have stringent requirements can be serviced with streams that have loose requirements).

At step 202 of the method, a device or process receives one or more input stream(s), each stream having a plurality of packets. In one exemplary embodiment, the streams include both isochronous and asynchronous data streams. For example, in one implementation, an Ethernet interface is configured to service a first portion (isochronous data traffic), and a second portion (asynchronous data traffic). It will be appreciated that the method 200 is in no way limited to two (i.e., first and second portions); for instance, three streams might be used (such as one asynchronous and two isochronous, etc.) Various other combinations/permutations will be recognized by those of ordinary skill given the present disclosure.

Additionally, these first and second portions may be further subdivided by type or another criterion, such as priority. For example, a "Class A" and "Class B" isochronous data traffic might be used. One such implementation may support e.g., up to (but not exceeding) seventy five percent (75%) isochronous traffic, which is subdivided into Class A and Class B (where Class A traffic is always prioritized over Class B traffic), and twenty five percent (25%) asynchronous traffic.

Common examples of isochronous data include video data, audio data, game content (e.g., player position, game synchronization information, etc.), and conference content (e.g., mouse movements, key presses, etc.) In fact, any data having temporal relevance may be transported as isochronous data (e.g., environment, presence, location, time, etc.).

Moreover, it is further appreciated that each isochronous stream may be composed of packets, where each packet may be further subdivided into subpackets. Such implementations are common where multiple types of data are bundled together for a common playback time. For example, audio and video data that are played together can be bundled together in the same packet. In some other implementations, data may be bundled together where the data must be decoded together, but are separated for logical reasons (e.g., parity, error checking, etc.)

The input streams may be received from the same device, or alternately may be received from multiple different devices. For example, several source endpoints may generate multiple streams that are aggregated together at a destination endpoint. In other examples, a single source endpoint may generate multiple streams (e.g., multiple applications running simultaneously), for one or more destination endpoints.

In one exemplary embodiment, the isochronous data includes: (i) a header describing one or more isochronous data, (ii) the one or more isochronous data, and (iii) error checking information. Common examples of information that may be included within the header include: (i) source address, (ii) destination address, (iii) presentation or playback time, (iv) packet identifier, etc. The header may comprise other information such as: (i) path information (e.g., intermediate node addresses), (ii) length of the packet, (iii) total length of the stream, (iv) encoding type, (v) codec information, (vi) Quality of Service (QoS) or priority information, etc.

At step 204, the device sorts the received packets according to their presentation time. In one embodiment, the device received data packets from multiple chronological sources, and interleaves them into chronological order. While each source provides a chronological sequence of packets, packets supplied from independent sources may not be chronological (due to discrepancies in device timing, network synchronization issues, etc.).

In one exemplary embodiment, the packets are sorted into a buffering mechanism by presentation time. One example of a suitable buffering system is a so-called "ring" buffer. A simple ring buffer is constructed of a memory with a read pointer, where the read pointer is configured to increment, and where the pointer "rolls over" to the first address after the last address. Each packet is written into the ring buffer according to the order of presentation. Other common examples of suitable memory structures include normal buffers and queues, linked lists, stacks, etc.

In one variant, the packets are additionally interspersed with other packet types. Such other packet types may include asynchronous packets ("best effort"), isochronous packets of a different priority (e.g., (Class A, Class B), etc. For example, in one such scheme, the buffer is populated with up to a first percentage (e.g., seventy five percent (75%)) isochronous packets, and a second percentage (e.g., twenty five percent (25%)) asynchronous packets. In some implementations, the packets are further divided into priority classes, so that the allotments to isochronous and asynchronous data are necessarily filled with higher priority packets before adding lower priority packets.

The buffer may further include priority information; such priority information may be based on: data type (e.g., Class A, Class B, etc.), temporal considerations (e.g., priority is increased as the packet gets closer to the desired presentation time), source consideration (e.g., the packet was sent from a high priority source, etc.)

In yet other variants, the buffer may include information about the packetized data. For example, such information may include a media stream identifier, a source identifier, a destination identifier, a media type identifier, etc. In addition, implementations which subdivide packets into subpackets may further itemize the subpacket information, which may include similar information (e.g., a media stream identifier, a source identifier, a destination identifier, a media type identifier, etc.)

At step 206, the device calculates each packet's launch time. In one exemplary embodiment, the device reads the presentation time of the packet from its header, and calculates a launch time of the packet according to one or more considerations. Such considerations may include, but are not limited to: (i) the device's own master time, (ii) the network time, (iii) the recipient device's master time, (iv) the network interface controller (NIC) time, path delay, and/or (v) packet characteristics (e.g., packet priority, packet type, etc.).

Common examples of a calculated launch time include, but are not limited to: (i) an assigned time slot, (ii) a range of acceptable time slots. (iii) an assigned transmission time, and (iv) a range of acceptable transmission times. In some embodiments, it may be acceptable, or even desired, that certain packets are not assigned a launch time (e.g., low priority packets, asynchronous packets, etc.). In one implementation, the calculated launch time corresponds to a time base of a network interface controller (NIC).

As a brief aside. Ethernet does not have stringent time synchronization requirements (the network time base can vary by as much as ten milliseconds (10 ms) between devices). However, the aforementioned modified Ethernet network interface controllers (NICs) have internal clocking which is significantly faster; exemplary Ethernet NICs can transmit in time slots which are accurate to within one microsecond (1 µs). Furthermore, it is not uncommon for networked devices to also maintain an internal master time which can be accurate to several nanoseconds (ns).

EQN. 1 and EQN. 2 provide exemplary equations for converting from one time base to another time base. EQN. 1 can be used where both the device time base ($t_d$), and the source time base ($t_s$) have the same clock rate, but may have an offset in time:

$$T'=T+\tau \quad \text{(EQN. 1)}$$

where:
T'=the adjusted presentation time for the device time base ($t_d$);
T=the presentation time for the source time base ($t_s$); and
$\tau=t_d-t_s$.

EQN. 2 can be used where both the device time base (t), and the source time base ($t_s$) have a fixed proportionate relationship, even though the clock rates differ:

$$T'=kT+T_0 \quad \text{(EQN. 2)}$$

where:
T'=the adjusted presentation time for the device time base ($t_d$);
T=: the presentation time for the source time base ($t_s$);
$k=t_s/t_d$; and
$T_0$=an offset value.

Other differences in time base may require more complicated schemes. For example, some time bases may not be continuous (i.e., may start and stop), may use non-constant clock rates (i.e., 1× rate, 2× rate, 4× rate, etc.), and/or may need to compensate for clock artifacts (e.g., excessive jitter, clock drift, etc.). However, it is appreciated that a wide range of conversion algorithms exist in the related arts for converting times from one clock domain to another clock domain.

More generally, the method of the embodiment of FIG. 2 calculates launch times for each packet according to one time base for each output stream. Consequently, a device receiving a first number of input streams and generating a second number of output streams will adjust each of the packets according to their respective output time bases. In one embodiment, each time base is a network interface controller (NIC) clock (e.g., a crystal oscillator within the NIC). For example, a device receiving two (2) input streams and generating one (1) output stream will calculate launch times for each packet received from the two (2) input streams, for the NIC. Similarly, a device receiving three (3) input streams and generating two (2) output streams will calculate launch times for each packet received from the three (3) input streams, corresponding to the appropriate time base for the desired output streams (e.g., a packet destined for the first output stream time will have launch times corresponding to a first NIC a packet destined for the second output stream time will have launch times corresponding to a second NIC). In simplified embodiments, the output time bases may be based on a single master time base (where a single NIC transmits multiple streams, where multiple NICs share a time base, and/or where multiple NIC time bases are based on a master clock).

Furthermore, while discussed above with respect to packet formats, it is further appreciated that packet formats composed of multiple subpackets may be divided into constituent subpackets, recombined, etc. For instance, a device receiving one (1) input stream consisting of packets containing audio and video subpackets can be divided into: (i) an audio stream consisting of packets containing audio subpackets that have been re-timed for an audio time base, and (ii) a video stream consisting of packets containing video subpackets, that have been re-timed for a video time base. These time bases may be the same or different.

Moreover, in one exemplary embodiment, the presentation time is preserved throughout transfer (i.e., the launch time has no impact on presentation time), or that the presentation time indicated in the packet is the same between the source and destination endpoint. However, it is appreciated that in some embodiments, the presentation times of the packets can be adjusted. Similarly, some embodiments may add or update a metadata field with the presentation time information.

At step 208 of the method 200, the device generates the one or more output stream(s) based on the calculated packet launch times. In one embodiment, the device has previously negotiated, or was assigned a network resource, for transmitting buffered data. Common examples of a network resources include time slots, frequency bands, spreading codes, time-frequency resources, etc. In other embodiments, the resources are arbitrated during operation, in some cases, with acceptable levels of collision.

Transmission of each packet over the network resource is performed by reading the packets out of the buffer, and transmitting them on the network resource. Since the packets have been stored within the buffer in the exemplary embodiment with a calculated launch time, the resulting stream will be properly ordered for transmission. In some situations, where packets or resources are dropped or where the source and destination endpoint lose synchronization, it may be necessary to increment and/or decrement the reading or writing of the buffer accordingly. In one exemplary embodiment, a very simple processing engine of the network interface controller (NIC) can execute transmission. In some embodiments, the NIC can perform direct memory access (DMA) type transactions, transmitting packets out of the buffer without further supervision (e.g., unmoderated by the application processor, etc.)

In one implementation of the present invention, each packet is assigned a slot time during which the packet can be transmitted. In alternate implementations, packets are assigned slot times as slots are available, the packets are transmitted according to presentation order.

In some embodiments, the device may not be assigned a sufficient number of time slots to transmit all of its data. "Stale" isochronous packets (i.e., isochronous packets which have not or cannot meet their delivery time requirements) can generally be discarded; however, asynchronous packets can be delivered at the next opportunity for spare bandwidth since these packets do not have time requirements. In some cases, postponing asynchronous packet delivery and/or skipping stale isochronous packets may require that the buffer is reordered.

In yet other embodiments, the buffers for isochronous and asynchronous data are separated, to prevent the asynchronous data from overwriting asynchronous data.

Example Operation

Figure 3:
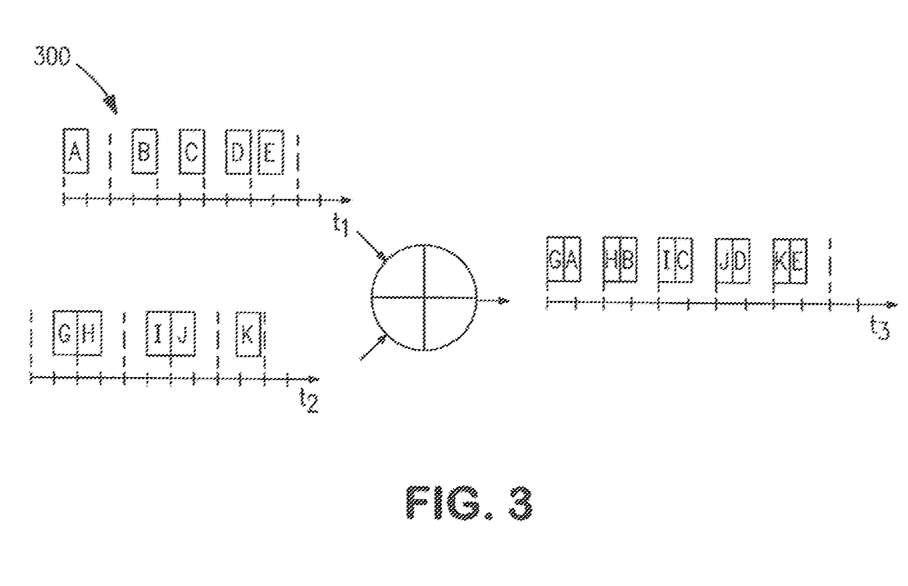
FIG. 3 is a graphical representation of one exemplary technique for interleaving multiple independent chronological streams of packets in accordance with the present invention.

Referring now to FIG. 3, one exemplary scheme for interleaving multiple independent chronological streams of packets is graphically illustrated. As shown, a first stream includes an isochronous series of packets arriving according to a first time base ($t_1$), and a second stream includes an isochronous series of packets arriving according to a second time base ($t_2$). The packets are aggregated by an Isochronous Cycle Manager (e.g., ICM), and transmitted according to a third time base ($t_3$). The time bases are different, and not shown to scale. More specifically, while each stream provides a sequence of packets in chronological presentation time order; the packets from multiple streams may not arrive in proper chronological presentation time order. For example, as shown, packet C arrives after packet J, even though packet C has a presentation time before packet J.

The ICM receives the first and second stream of packets, where the received packets are sorted, and then inserted into a buffering mechanism (e.g., ring buffer) according to their required presentation time. Additionally, the ring buffer also contains a mapping between the stream (first, second), and the slots assigned to that stream (if multiple are available).

In one embodiment, the Isochronous Cycle Manager (e.g., ICM) operates according to a time division multiplexed (TDM) scheme, where each of a plurality of cycles is subdivided into time slots. In one implementation, each cycle consists of one-hundred twenty five (125) time slots, where each time slot is one microsecond (1 μs) in duration. The ICM negotiates, or alternatively is assigned) time slots to transmit during each cycle. In one embodiment, the ICM calculates and assigns each packet a corresponding launch time.

During execution, a cycle timer counts a designated multiple of the isochronous cycle time period; each time that the timer fires, the designated multiple cycles worth of data are transferred to the NIC. The launch times of each packet correspond to the NIC's time domain. The NIC subsequently transmits each of the packets in accordance with the calculated launch times.

Figure 4:
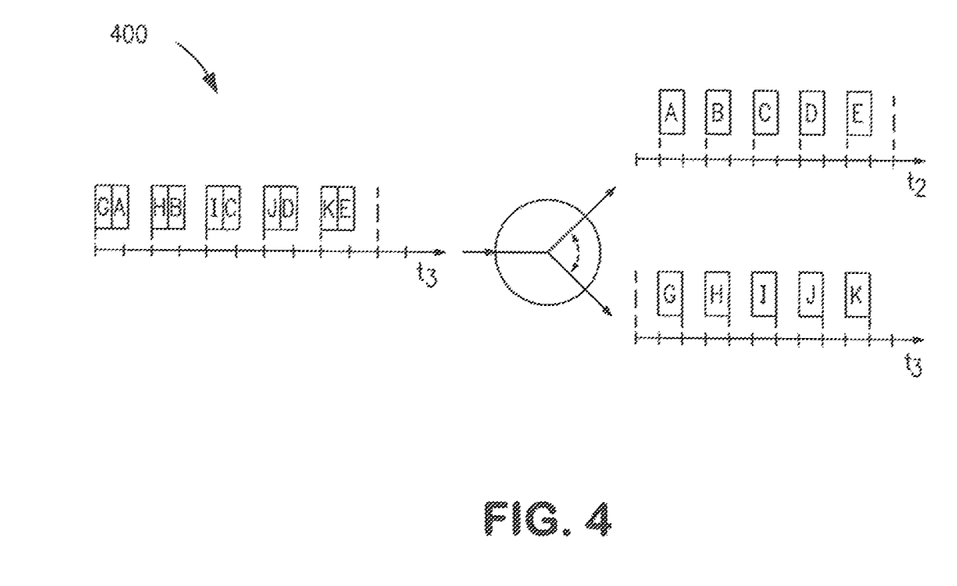
FIG. 4 is a graphical representation of one exemplary technique for deinterleaving a chronological stream of packets in accordance with the present invention.

The reverse process is shown in FIG. 4, where one exemplary scheme for deinterleaving an aggregated chronological stream of packets according to the invention is illustrated. As shown, an input stream includes an isochronous series of packets according to a first time base ($t_1$). The packets are deinterleaved (separated) into the first and second constituent streams by the Isochronous Cycle Manager (e.g., ICM), and transmitted according to the second and third time bases respectively ($t_2$, $t_3$).

The ICM receives the input stream of packets, and splits the received packets into first and second First-In-First-Out (FIFO) buffers, with launch times configured for the first and second NIC hardware respectively. The first buffer is transferred to a first NIC according to the second time base in order to generate the first isochronous output data stream. Similarly, the second buffer is transferred to a second NIC according to the third time base, thereby generating the second isochronous output data stream.

During execution, a cycle timer for each NIC counts a designated multiple of the isochronous cycle time period; each time that the timer fires, the designated multiple cycles worth of data are transferred to the respective NIC. Each NIC subsequently transmits each of the packets in accordance with the calculated launch times. In some embodiments, the NICs share a common time base; however, other embodiments may have a distinct time base for each NIC.

Figure 5:
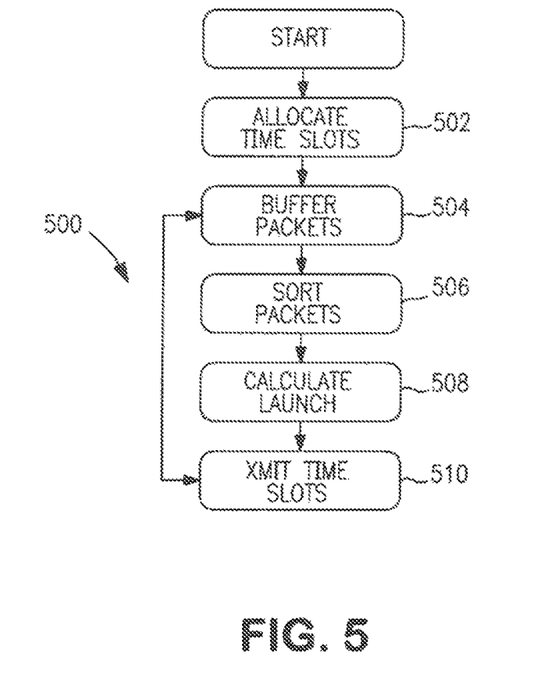
FIG. 5 is a logical flow diagram illustrating one exemplary embodiment of a method for scheduling a time division multiplexed (TDM) packing scheme, according to the present invention.

Referring now to FIG. 5, one exemplary embodiment of a method for scheduling a time division multiplexed (TDM) packing scheme according to the present invention is illustrated.

Initially at step 502, the ICM negotiates or allocates time slots to stream the isochronous data stream (and deallocates time slots when streams are finished). The ICM (or another entity/process acting as a proxy) calculates the required number of slots to transmit all the data for the cycle. For example, the number of microseconds (µs) or time slots necessary to transmit the collected data is tallied, and rounded up to the nearest increment. In some implementations, the required number of slots must additionally be contiguous. Contiguous slots can improve overall network overhead by reducing switching overhead, arbitration overhead, etc. However, in some embodiments, non-contiguous slots may be used e.g., where additional flexibility is required, and/or where certain services can be prioritized, etc. For example, in one such embodiment, best-effort delivery or even low priority isochronous packets can be delivered when slots are available (such as during gaps between other high priority traffic).

At step 504, a timer counts down a time interval (e.g., one or more multiples of the isochronous cycle time period), during which time a buffer collects data from the input streams. In one implementation, the buffer continues to collect data until a full cycle of data has been buffered.

The collected data is sorted by presentation time (step 506), and a launch time is calculated for each packet (step 508). For example, each packet is assigned a time slot for transmission in the NIC's time base (e.g., adding an offset, or scaling by a scale or difference factor). In this manner, even if the input stream packets arrive out of sequence, the output of the node has been sorted into appropriate presentation time order, and assigned a launch time (according to that order).

It will be appreciated that other sorting orders and/or intervals may be applied consistent with the invention. For instance, one sorting criterion may comprise sorting based on packet type (e.g., where Emergency Medical Services (EMS) type packets may be granted a higher priority, etc.)

At step 510, the time slots are provided to the NIC for transmission. This greatly reduces processor burden. In some embodiments, the NIC can perform direct memory access (DMA) type transactions, transmitting packets out of the buffer according to their calculated launch time.

In one embodiment, the transmitted time slots retain the sorted order; i.e., packets are transmitted in the order of their presentation time. Thus, the packet which is to be presented next is always transmitted in the first available time slot preceding presentation.

Unpacking the TDM packed stream is simpler. In one embodiment, each time slot is inspected for packets; when a packet is extracted, it is routed to the appropriate buffer queue (e.g., a queue for each stream). Since the packets arrive in the proper chronological order (e.g., presentation order), the queues are correctly ordered for subsequent use or processing, such as audio/video playback in the illustrated example.

While the packets are chronologically ordered, in some cases packets may be dropped, corrupted, etc. Accordingly, in some embodiments, the packets may be further processed or checked; e.g., to facilitate lost packet identification or recovery, decryption. For example, data streams which can tolerate some packet loss may utilize a running packet count, to determine if a packet has been dropped. Similarly, error checking routines (e.g., Cyclic Redundancy Check (CRC)) may be executed to identify corrupted packets. Still other embodiments may recover various packet errors, based on e.g., parity bits, Forward Error Recovery (FEC) techniques (viterbi coding, turbo coding, etc.)

Exemplary Apparatus

Figure 6:
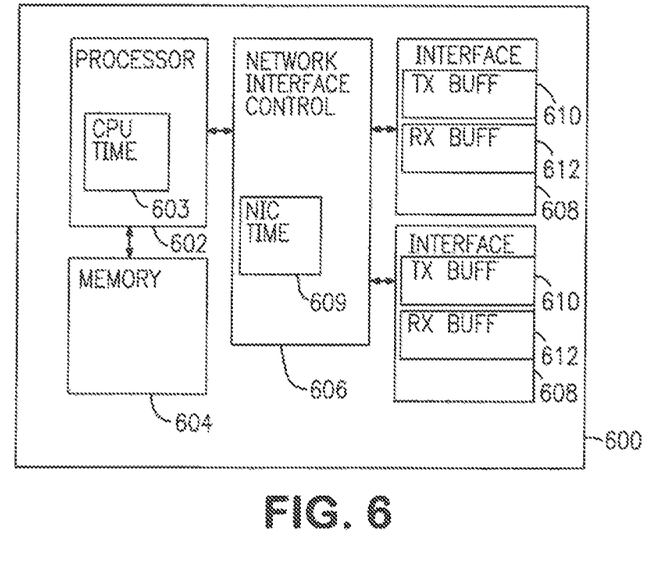
FIG. 6 is a block diagram of an exemplary apparatus useful for implementing the methods of the present invention.

FIG. 6 illustrates one exemplary embodiment of an apparatus 600 useful for implementing various methods of the present invention. The apparatus of FIG. 6 includes a processor subsystem 602 such as a digital signal processor, microprocessor, field-programmable gate array, or plurality of processing components mounted on one or more substrates. The processing subsystem may also include an internal cache memory. The processing subsystem is in communication with a memory subsystem 604 including memory which may for example, comprise SRAM, Flash and SDRAM components. The memory subsystem may implement one or a more of direct memory access (DMA) type hardware, so as to facilitate data accesses as is well known in the art. The memory subsystem contains computer-executable instructions which are executable by the processor subsystem.

The processor subsystem 602 is further configured to track a master time base 603. This master time base may be derived from an internal clock such as an internal oscillator circuit (e.g., Voltage Controlled Temperature Controlled Crystal Oscillator (VCTCXO), etc., or alternately may be reported or received from an external device or entity, such as a Global Positioning System (GPS), IEEE Std. 1588 (Precision Time Protocol), etc.

Additionally, the apparatus includes a communications controller (e.g., NIC) 606, which manages communications between endpoints. The NIC is in operative communication with one or more network interfaces 608. The network interfaces are further configured to transmit and/or receive packetized traffic. In one embodiment, each network interface is associated with a corresponding time base. Each time base may or may not be further synchronized with the other time bases.

The NIC subsystem 606 further includes an internal time base 609. This NIC time base may be derived from an internal clock such as an internal oscillator circuit (e.g., Voltage Controlled Temperature Controlled Crystal Oscillator (VCTCXO), Voltage Controlled Crystal Oscillator (VCXO), Crytal Oscillator (VCO), etc.

In one exemplary embodiment, the one or more network interfaces are Ethernet compliant interfaces (IEEE Std. 802.3). In alternate embodiments, the one or more network interfaces are configured for use with a serial bus protocol. Common examples of such serial bus protocols useful with the invention include but are not limited to: Universal Serial Bus (USB), FireWire (IEEE Std. 1394), High Definition Multimedia Interface (HDMI), Digital Visual Interface (DVI), and DisplayPort.

In one exemplary embodiment, the network interfaces are time division multiplexed (TDM). During TDM operation, the network interface transmits and/or receives packets only during assigned and/or negotiated time slots of a cycle. The transmission/reception may be implemented for example as full- or half-duplex.

In another embodiment, the network interfaces are frequency division multiplexed (FDM), where the network interface is configured to transmit and/or receive packets via a specified frequency band.

In yet other embodiments, the network interfaces are code division multiplexed, which are configured to transmit and/or receive packets using a spreading factor. Orthogonal Frequency Division Multiplexing may also be used, which specifies both time and frequency resources.

Yet other medium access schemes may be used consistent with the invention.

As previously described, packetized traffic is data which has been formatted into discrete units or packets of data. Each packet includes at least routing information and payload. The routing information provides e.g., source and destination addresses, error detection codes, and sequence information. Additionally, isochronous data packets contain presentation information, where the presentation information is specific to the packet's time base.

In some embodiments of the present invention, the packetized traffic may provide various guarantees for reliability. For example, a "reliable" service may provide explicit acknowledgment (ACK) or non-acknowledgement (NAK), whereas "unreliable" service may not provide any feedback as to transmission success or failure. Moreover, it is further recognized that packetized traffic encompasses unreliable "datagrams" (such as those used in real-time traffic protocols such as Real Time Protocol (RTP) and User Datagram Protocol (UDP)), as well as more specialized audio/visual formats (such as Packetized Elementary Stream (PES)).

Packetized traffic can consist of varying portions of asynchronous and isochronous data. In one exemplary embodiment of the invention, the packetized traffic is a mixture of isochronous packets and asynchronous packets, where at least a portion of the packets are further prioritized. Such prioritization can be in accordance with a given proportion (e.g., seventy five percent (75%) isochronous, twenty five percent (25%) asynchronous), which may be fixed or variable as a function of time or other parameter(s). Alternately, such prioritization may be based on data class (e.g., Class A, Class B), or according to various requirements for quality of service (QoS).

The exemplary apparatus 600 of FIG. 6 has one or more transmit buffers 610 for transmitting isochronous data via at least one of the network interfaces. Each transmit buffer is further configured to transmit its contents in an orderly sequential fashion. The transmit buffer may be for example a ring buffer of the type previously described herein. Alternatively, the buffer may have finite depth, where the depth is commensurate with an allowed transmission capacity. During such transmission, the buffer is read to completion, and rewritten for the next available transmission.

During operation, received isochronous packets are re-timed according to the NIC master time base 609 (or the time base associated with the transmit queue). The isochronous packets are sorted according to e.g., presentation time, into the transmission buffer. Each packet's launch time is determined, the resulting buffer of packets is properly ordered for timely transmission.

In some variants, only a portion of the buffer can be filled with isochronous data, the remaining portion is filled with asynchronous data. Alternatively, the buffer does not distinguish between isochronous and asynchronous data. In such cases, the data may be further prioritized. For example, in one such prioritization scheme, asynchronous data can be added in any proportion, as long as the higher priority data (e.g., isochronous data) is serviced first. In yet other variants, isochronous data and asynchronous data are transmitted from different memory buffers.

The transmit buffers of the apparatus of FIG. 6 are further configured to transmit a packet at a designated launch time. In some systems the designated launch time may acceptable within a design tolerance (such tolerances can be imposed by hardware limitations, network limitations, application limitations, etc.) In alternate implementations, the transmit buffers are configured to transmit packets via a designated network resource; e.g., a time slot, frequency band, spreading code, etc.

The transmit buffers may also be configured to transmit packets within a range of time and/or network resources. For example, a transmit buffer may transmit isochronous packets according to a range of time slots, or alternatively as network resources permit.

The exemplary apparatus 600 of FIG. 6 also has one or more receive buffers 612 for receiving isochronous data via at least one of the network interfaces. The illustrated receive buffer is a First-In-First-Out (FIFO) buffer configured to receive a packets in a sequential fashion, although it will be recognized by those of ordinary skill that other buffer configurations may be used consistent with the invention.

The device may also include a user interface subsystem that includes any number of well-known I/O mechanisms including, without limitation: a keypad, touch screen (e.g., multi-touch interface), LCD display, backlight, speaker, and/or microphone. Moreover, in some embodiments, the device may additionally comprise various Audio/Visual (AV) apparatus.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

The invention claimed is:

1. A method of managing a plurality of isochronous processes, the method comprising:
   receiving, at a network element, a first isochronous data stream representing a first set of media content, the first data stream comprising a plurality of data packets and data representing presentation times, according to a first time base, of portions of the first set of media content;

receiving, at the network element, a second isochronous data stream representing a second set of media content, the second data stream comprising a plurality of data packets and data representing presentation times, according to a second time base differing from the first time base, of portions of the second set of media content;

multiplexing the packets of the first and second data streams to produce a composite data stream, including sorting the respective data packets of the first and second data streams based on their respective presentation times and a difference between the first and second time bases;

calculating launch times for the packets of the composite data stream based on the sorting the respective data packets of the first and second data streams; and transmitting from the network element the data packets of the composite data stream according to their respective launch times.

2. The method of claim 1, additionally comprising:
receiving asynchronous data packets; and
transmitting the asynchronous data packets from the network element.

3. The method of claim 2, additionally comprising sorting the asynchronous data packets with the isochronous data packets.

4. The method of claim 2, wherein a first portion of transmission bandwidth is reserved for isochronous data packets, and a second portion of transmission bandwidth is reserved for asynchronous data packets.

5. The method of claim 1, wherein the act of sorting comprises storing the isochronous data packets in a ring buffer according to the presentation time.

6. The method of claim 1, wherein at least one of the first and second isochronous data streams comprises video data.

7. The method of claim 6, wherein at least one of the first and second isochronous data streams comprises audio data.

8. The method of claim 1, wherein at least one of the first and second isochronous data streams has a time base that differs from a master time base.

9. The method of claim 8, wherein the act of calculating comprises adjusting the launch time of the isochronous data packets according to the master time base.

10. The method of claim 1, further comprising:
determining whether asynchronous data packets may be transmitted between isochronous data packets of the composite data stream while maintaining transmissions at the calculated launch times.

11. The method of claim 1, wherein the launch times are based on the respective time bases of the isochronous data streams.

12. The method of claim 1, wherein only a subset of the packets have a presentation time associated therewith.

13. The method of claim 1, wherein at least one of the isochronous data streams comprises both video and audio data.

14. The method of claim 1, wherein the plurality of data packets comprise one or more subpackets of data.

15. A network interface apparatus, comprising:
a data interface configured to receive:
a first isochronous data stream representing a first set of media content, the first data stream comprising a plurality of data packets and data representing presentation times, according to a first time base, of portions of the first set of media content, and
a second isochronous data stream representing a second set of media content, the second data stream comprising a plurality of data packets and data representing presentation times, according to a second time base differing from the first time base, of portions of the second set of media content; and
at least one controller configured to:
extract one or more data packets from the first and second isochronous data streams;
multiplex the packets of the first and second data streams to produce a composite data stream, including sorting the respective data packets of the first and second data streams based on their respective presentation times and a difference between the first and second time bases;
calculate launch times for the packets of the composite data stream based on the sorting the respective data packets of the first and second data streams; and
transmit from the data interface data packets of the composite data stream according to their respective launch times.

16. The network interface apparatus of claim 15, the controller further configured to assign the sorted one or more data packets to a slot of data.

17. The network interface apparatus of claim 15, wherein the plurality of data packets of the first isochronous data stream comprise an isochronous data packet.

18. The network interface apparatus of claim 15, wherein:
the data interface is further configured to receive asynchronous data packets; and
the controller is further configured to calculate a launch time for the asynchronous data packets.

19. The network interface apparatus of claim 15, wherein only a subset of the plurality of packets of the first data stream have a presentation time associated therewith.

20. The network interface apparatus of claim 15, wherein at least one of the first and second isochronous data streams comprises both video and audio data.

21. The network interface apparatus of claim 15, wherein the plurality of data packets comprise video data.

22. The network interface apparatus of claim 15, wherein the plurality of data packets of the first isochronous data stream comprise audio data.

23. The network interface apparatus of claim 15, wherein the plurality of data packets of the first isochronous data stream comprise one or more subpackets of data.

24. The network interface apparatus of claim 15, wherein:
the data interface is further configured to receive asynchronous data packets; and
the controller is further configured to transmit the asynchronous data packets from the data interface.

25. The network interface apparatus of claim 24, wherein the controller is further configured to sort the asynchronous data packets with the first and second isochronous data packets.

26. The network interface apparatus of claim 24, wherein a first portion of transmission bandwidth is reserved for isochronous data packets, and a second portion of transmission bandwidth is reserved for asynchronous data packets.

27. The network interface apparatus of claim 15, further comprising a ring buffer and wherein the controller sorting the one or more data packets comprises storing the isochronous data packets in the ring buffer according to the presentation time.

* * * * *